UNITED STATES PATENT OFFICE.

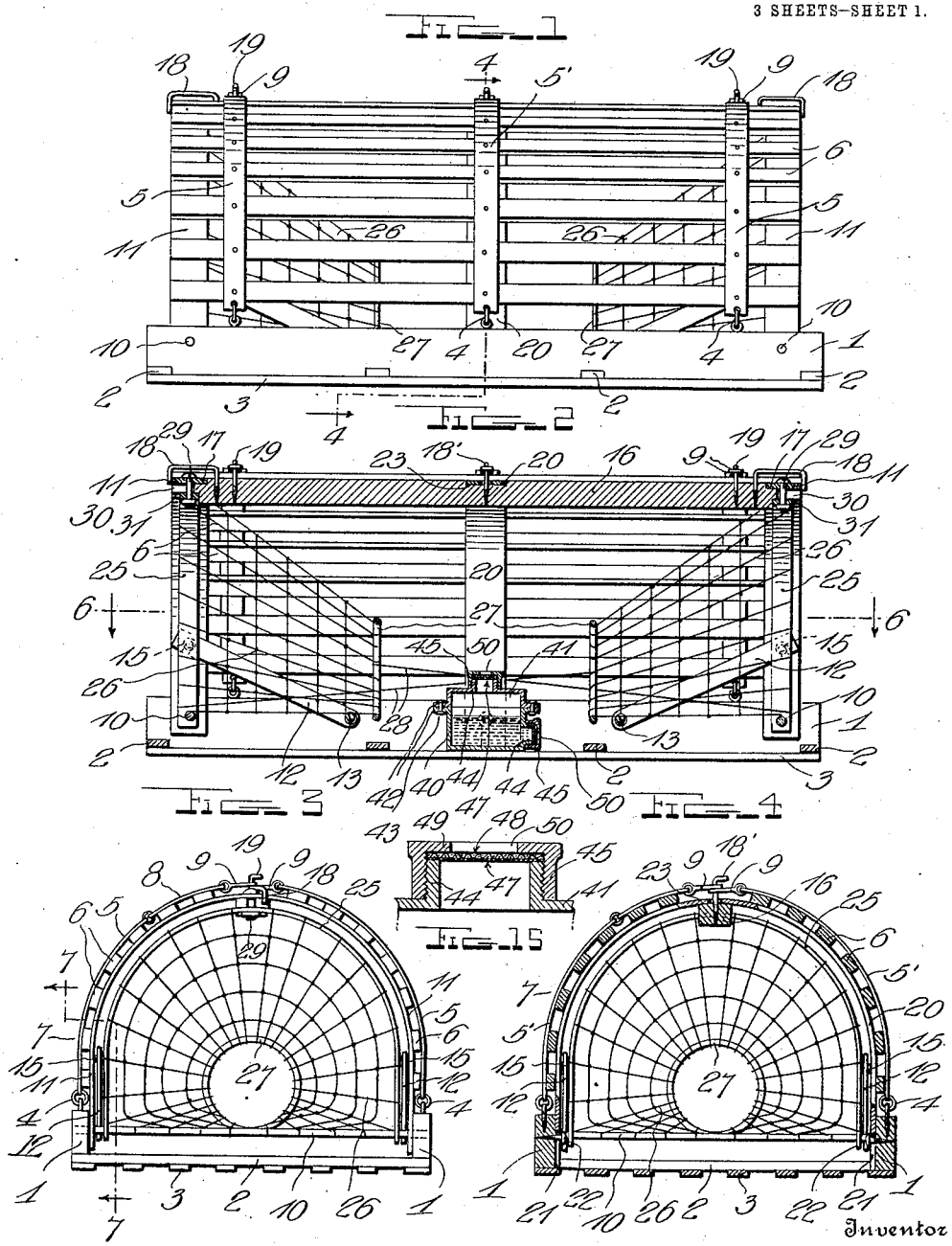

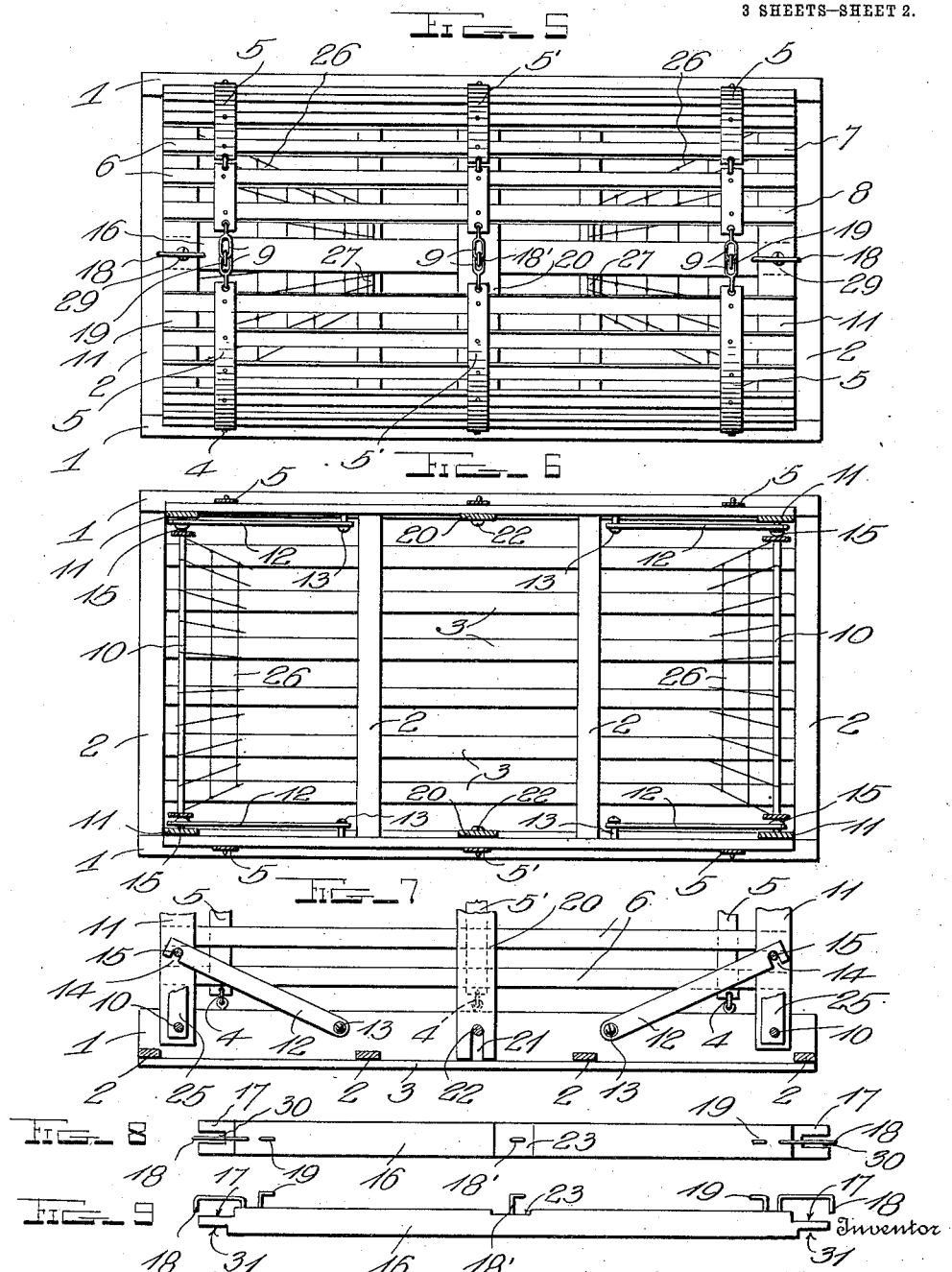

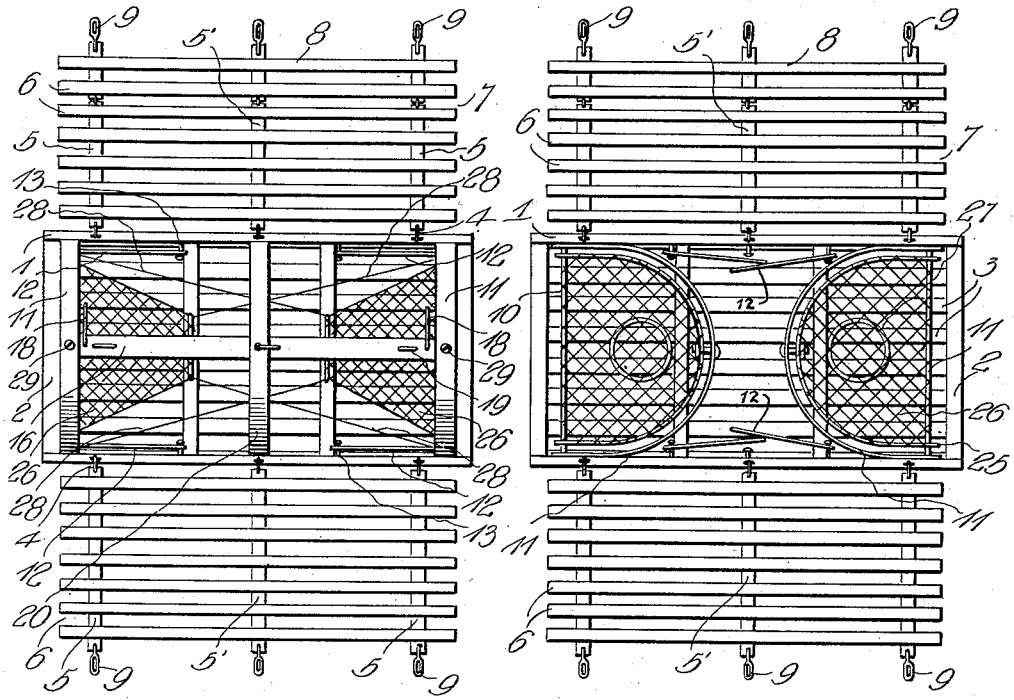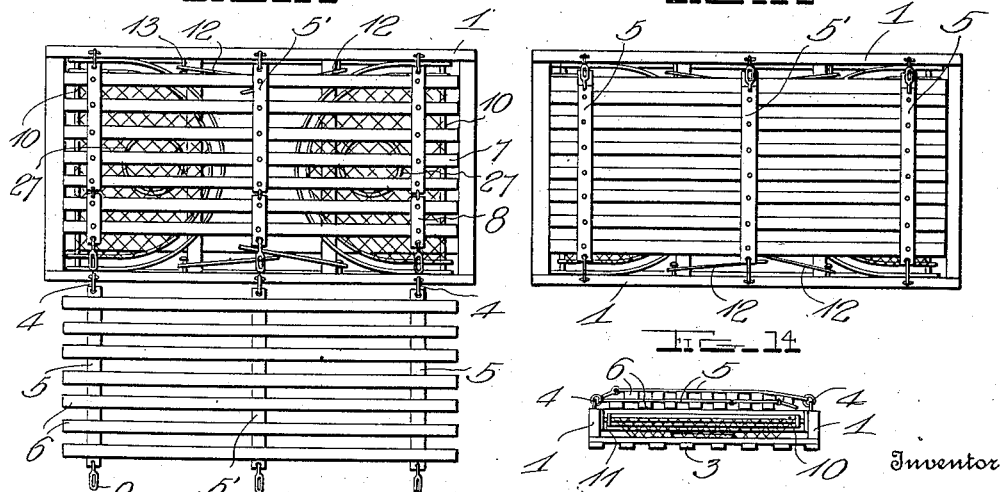

ARTHUR A. NOYES, OF NEW YORK, N. Y., ASSIGNOR TO MINERVA S. AUSTIN, OF NEW YORK, N. Y.

LOBSTER-TRAP.

1,079,576.  Specification of Letters Patent.  Patented Nov. 25, 1913.

Application filed November 18, 1912. Serial No. 732,158.

*To all whom it may concern:*

Be it known that I, ARTHUR A. NOYES, a citizen of the United States, residing at New York, in the county of New York and State of New York, have invented certain new and useful Improvements in Lobster-Traps; and I do declare the following to be a full, clear, and exact description of the invention, such as will enable others skilled in the art to which it appertains to make and use the same.

The present invention is a trap, designed more especially for catching lobsters and the like, and therefore intended to be used under water; and the object of the same is to so construct the trap that it may be readily folded into small compass as for storing during the winter and quickly set up for use during the catching season. This object is carried out by constructing the device in the manner hereinafter more fully described and claimed, and as shown in the drawings wherein—

Figure 1 is a side elevation of the trap, and Fig. 2 a central longitudinal sectional view thereof. Fig. 3 is an end elevation, and Fig. 4 a cross section on the line 4—4 of Fig. 1. Fig. 5 is a plan view, and Fig. 6 a horizontal section on the line 6—6 of Fig. 2. Fig. 7 is a vertical section on the line 7—7 of Fig. 3. Figs. 8 and 9 are respectively a plan view and a side elevation of the top bar. The next four views are plan views showing this trap and its parts in the positions they assume in the act of folding it. Fig. 10 shows the two sides opened, Fig. 11 shows the two ends folded inward, Fig. 12 shows one of the sides folded inward over the two ends, and Fig. 13 shows the other side folded inward over the first side. Fig. 14 is an end elevation of the folded trap. Fig. 15 is an enlarged sectional detail through one of the outlets of the bait holder illustrated in Fig. 2.

Those who are engaged in the business of trapping or catching lobsters and the like are aware that these traps are set at the beginning of the season and remain set until it is closed, then they are taken up and put away until the next season. The result is that, on account of their size, the average trapper does not have sufficient storage room to accommodate his traps and he leaves them out of doors during the winter and exposed to the elements. Moreover, it is inconvenient to carry a large lobster trap on a fishing boat of the average size employed in this business, and at the beginning of the season repeated trips have to be made to the trapping ground in order for the trapper to take out his traps two or three at a time and set them. Finally, it is well known that the bait with which traps of this character are provided must be repeatedly renewed, owing to the incursion of sea insects which feed upon it. To avoid these well-known objections and difficulties I have provided a folding trap which is quite rigid when set up and occupies but little space when collapsed; and with it I use a bait holder for containing a floating or soluble bait whose principal ingredient may be the oil of fish, such as menhaden, when the trap is employed for lobsters, because the latter sense the presence of food more by smell than by sight, and I cover the outlets from said bait holder with screens of peculiar character so that the insects referred to cannot get at it.

Coming now more particularly to the details of the present invention, the numerals 1, 1 designate a pair of sills connected at intervals by cross bars 2 which carry slats 3 forming the bottom of this trap; and I may say at starting that the parts are of any desired sizes, proportions and materials, although the finished trap will be of the usual type when set up and of a proper size and weight to be readily handled by one or two men. Loosely connected with the upper edge of each sill 1 as at the points 4, 4 is a side member consisting of flexible straps 5—preferably of galvanized sheet iron—and longitudinal slats 6, and one of said sides 7 has a hinged section 8 near its outer edge as best seen in Fig. 3, while both of the sides carry links 9 at their free edges.

On cross rods 10 connecting the sills 1 near both ends of the latter are mounted ribs 11—preferably of rather stout strip metal—which are of inverted U-shape and of a size to fit under the two sides when the latter are folded together as best seen in Fig. 4 or to be turned down onto the slatted bottom as best seen in Fig. 11. When turned to upright position, each rib is sustained by means of an oblique brace 12 which is pivoted at its inner end at 13 inside the sill and notched near its outer end as at 14 so as to engage over a pin or stud 15 in the side of the rib 11. By preference there are four of these braces as seen in Fig. 11, and obviously they may be turned downward on their pivots 13 so as to lie inside the two sills. Coacting with the ribs is a top bar best seen in Figs. 8 and 9, preferably made of wood and of a proper length to connect the arched centers of the ribs as seen in Fig. 2. The top bar has a straight rigid body 16 recessed at its ends on its upper side as at 17 to receive the arched centers of the ribs and provided adjacent each recess with a latch 18 adapted to engage over the rib 11 as seen in Fig. 2. Adjacent each latch is a fastening device which may well be a screw hook 19, over which the links 9 of the two sides may be passed as seen in Fig. 3, and to hold these links and therefore the two sides in place the bill of the hook will be turned away from the side which is last brought up and hooked, as seen in Fig. 5. By rotating the hook through a half revolution the link will obviously be released, and then by turning it again for another half revolution the link of the other side will obviously be released. By preference the sides have a third or intermediate strap 5', latched in the same manner as seen in Fig. 5, and if the trap is long enough it may have a plurality of such additional straps.

In some cases, and especially where the trap is of some considerable size or length, or both, I provide an additional or intermediate rib 20 having notches 21 in its extremities which are seated removably over pins 22 in the inner faces of the sills 1 and which when set up will engage a central recess 23 in the top bar 16 and be held therein by an intermediate latch 18'. Here also there may be several of these intermediate ribs if the trap is of considerable length.

The approaches to this trap are preferably at its opposite ends, and therefore I need describe but one. Pivotally mounted near its extremities on said cross rod 10 is a second and smaller arch 25—also preferably made of strap metal—which is similar to the rib 11 but of slightly smaller dimensions throughout so that it will not contact therewith when set up, and secured to this arch and to the cross rod 10 is the larger end of a cone-shaped piece of netting—preferably of twine—indicated at 26 as leading inward to a ring 27 which is secured within its smaller end, and which ring is held upright by cords or wires 28 leading from it to the remote end of the trap best seen in Figs. 2 and 10. Each arch is held upright and in parallelism with the rib which covers it by means of a bolt 29 passing through the tops of these members and engaging a notch 30 in the end of the top bar 16, and the latter may be recessed as at 31 on its under side to receive the center of the arch 25 as best seen in Figs. 2 and 3. I prefer to mount the netting (especially if it is of cordage) on an independent arch rather than on one of the ribs, so as to prevent it from being chafed when the device is being opened or closed or while the trap is stored away, and I prefer to lead each cord 28 from the ring 27 to the opposite arch 25 at a point somewhat above the pivotal line 10 of the latter so that as each rib and its arch is turned to an upright position it will draw on the cords connected with the ring attached to the opposite arch and the netting approaches 26 will be stretched taut.

With the above description of parts, the trap in its folded condition will appear as in Fig. 14 and in plan view as in Fig. 13. To set it up, one side is opened first as seen in Fig. 12, and then the other side as seen in Fig. 11; and finally both ends are set upright and the top bar and additional rib put in place as seen in Fig. 10. The slatted sides are then brought up over the ribs and engaged with the fastening devices 19, that side last which has the hinge section 8; and the trap with its bait holder inclosed may be carried to the trapping ground and put overboard. The lobsters scenting the bait enter one approach or the other and are trapped in a manner well understood.

In folding the trap as for storing it during the winter season, the operation above described is reversed. The bait holder is first removed as a matter of course; and to permit the parts to lie quite flat as seen in Fig. 14, the supplemental rib 20 (if it is employed) and the top bar 16 will be stored outside of the collapsed trap.

I have referred above to a liquid bait holder preferably employed in connection with this trap, and the same is illustrated in sectional view in Fig. 2 and a detail thereof in Fig. 15. This comprises a metallic body 40 and a metallic top 41, both parts having flanges 42 connected by rivets or bolts 43 so that they may be detached for gaining access to its interior; and the top (and possibly the body also) is provided with a nipple 44 externally threaded to receive a cap 45 which has through it an outlet opening 50. Within the cap over the end of the nipple I lay a sheet of gauze or fabric 47, and over the same I lay a sheet of wire netting 48 so that when the cap is screwed down its flange 49 bears on the netting and presses the latter against the edge of the fabric 47 and the fabric against the end of the nipple 44. If there be a similar nipple at one side of the body 40, as seen in Fig. 2, its outlet will by preference be closed in the same manner. The purpose of this detail of construction is to prevent the entrance into the body 40 and access to the food therein of those insects which consume it and require that the bait in a sea-trap be replenished daily or at frequent intervals, because obviously such insects cannot pass through netting and fabric, although the greater utility of the former is to protect the latter against the injurious effects of currents and objects washed thereby which might destroy the fabric.

It will not be necessary for the purposes of this specification to give the details of the liquid bait, but I prefer to make it of such ingredients that it will dissolve slowly under the influence of sea water and it will swell as it dissolves and possibly effervesce. The idea is that it shall give off clouds of a liquid which will be preferably visible but certainly of a characteristic appealing to the sense of smell of lobsters or other fish to be caught, and these clouds of course attract the lobsters to the trap. The presence of the sheets of fabric over the outlet, however, prevents the entrance to the bait holder of those insects which would eat the bait; and if the latter be of a composition which dissolves slowly and the bait holder of sufficient size it is quite possible that this improved trap need be baited only weekly or perhaps even less often.

What is claimed as new is:

1. A trap of the class described comprising a bottom, ribs of inverted U-shape pivoted at their ends to said bottom, a top bar having its extremities provided with recesses adapted to engage said ribs when the latter stand upright, latches mounted on said bar and adapted to hook over said ribs at this time, slatted sides loosely connected at their lower edges with said bottom and adapted to be drawn upward over said ribs, fastening devices between the adjacent edges of said sides, and approaches within the endmost ribs.

2. A trap of the class described comprising a bottom, ribs of inverted U-shape pivoted at their ends to said bottom and having pins in their sides, braces pivoted at their inner ends to said bottom and having notches near their outer ends engaging said pins when the ribs stand upright, a top bar having its extremities provided with recesses adapted to engage said ribs when the latter stand upright, latches mounted on said bar and adapted to hook over said ribs at this time, slatted sides loosely connected at their lower edges with said bottom and adapted to be drawn upward over said ribs, fastening devices in the top bar adapted to engage the upper edges of said sides, and approaches within the endmost ribs.

3. A trap of the class described comprising a slatted bottom, ribs of inverted U-shape pivoted at their ends to said bottom and having pins in their sides, braces pivoted at their inner ends to said bottom and having notches near their outer ends engaging said pins when the ribs stand upright, a top bar having its extremities adapted to engage said ribs when the latter stand upright, slatted sides loosely connected at their lower edges with said bottom and adapted to be drawn upward over said ribs, an intermediate rib of inverted U-shape having notches in its extremities, pins in the bottom with which said notches are adapted to be engaged when this rib stands upright and its center passes over said top bar, screw hooks in the latter adapted to engage links at the upper edges of said sides when they are stretched taut, and approaches within the endmost ribs.

4. In a knock-down trap for under-water use, the combination with a bottom, end ribs of inverted U-shape, rods across the bottom on which the ends of said ribs are pivotally mounted, means for distending said ribs and holding them upright, and a reticulated body connected with the edges of said bottom and passing over the ribs; of arches of inverted U-shape pivoted at their ends on said rods and underlying the ribs, means for connecting the centers of the arches with the centers of the ribs, and a reticulated approach of cone-shape connected at its larger end with each arch and having a ring at its smaller end.

5. In a knock-down trap for under-water use, the combination with a bottom, end ribs of inverted U-shape, rods across the bottom on which the ends of said ribs are pivotally mounted, means for distending said ribs and holding them upright, and a reticulated body connected with the edges of said bottom and passing over the ribs; of arches of inverted U-shape pivoted at their ends on said rods and underlying the ribs, means for connecting the centers of the arches with the centers of the ribs, an approach in the shape of a truncated cone having its larger end connected with said arch and cross rod, a ring for distending its smaller end, and cords leading from said ring to the arch at the opposite end of the trap.

6. In a knock-down trap for underwater use, the combination with a bottom, ribs of inverted U-shape pivoted at their ends thereto, a top bar having recesses in its upper side adapted to engage said ribs when the latter stand upright and also having recesses in its lower side, latches in said bar engaging said ribs when they lie in the recesses, and a reticulated body connected with the edges of said bottom and passing over the ribs and bar; of arches of inverted U-shape having their ends mounted on the pivots of said ribs and their bodies underlying and spaced from the latter and adapted to engage the lower recesses in said top bar when the arches stand upright, bolts connecting the tops of the arches and ribs, an approach in the shape of a truncated cone having its larger end connected with each arch, a ring in its smaller end, and cords leading from the ring to the remote arch.

In testimony whereof I have hereunto set my hand in presence of two subscribing witnesses.

ARTHUR A. NOYES.

Witnesses:
J. H. GHOLSON,
FRANK J. OLLEN.